(12) United States Patent
Wang

(10) Patent No.: US 6,989,992 B1
(45) Date of Patent: Jan. 24, 2006

(54) ASSEMBLING STRUCTURE FOR ELECTRONIC MODULES

(76) Inventor: Ying-Cou Wang, 6F, No. 19, Sec. 3, Nanking E. Rd., Taipei (TW)

( * ) Notice: Subject to any disclaimer, the term of this patent is extended or adjusted under 35 U.S.C. 154(b) by 0 days.

(21) Appl. No.: 10/920,369

(22) Filed: Aug. 18, 2004

(51) Int. Cl.
 *H05K 5/00* (2006.01)
(52) U.S. Cl. ............... 361/724; 361/816; 312/208; 439/532
(58) Field of Classification Search ........ 361/724–727, 361/679–687, 816; 385/53; 312/85, 208; 439/532, 716; 248/917–919
See application file for complete search history.

(56) References Cited

U.S. PATENT DOCUMENTS

| | | | |
|---|---|---|---|
| 4,958,889 A | * | 9/1990 | Boyle et al. ................ 361/683 |
| 6,132,242 A | * | 10/2000 | Hall et al. .................. 439/532 |
| 6,301,847 B1 | * | 10/2001 | Beck et al. ................... 52/239 |
| 6,554,486 B1 | * | 4/2003 | Takamatsu et al. ........... 385/75 |
| 2005/0168964 A1 | * | 8/2005 | Plabst ....................... 361/816 |

* cited by examiner

*Primary Examiner*—Hung Van Duong
(74) *Attorney, Agent, or Firm*—Rosenberg, Klein & Lee

(57) ABSTRACT

An assembling structure for an electronic module on a computer housing is disclosed. The computer housing has multiple rows of holes. The electronic module has two lugs at a first side thereof, and one lug at a second side thereof. A tongue extends from the second side and an aperture is defined through the tongue. A sleeve is mounted on the tongue. A plug has a front end inserted in the sleeve and fastened by a pin. A resilient member is provided between the plug and the sleeve. Whereby, the electronic module can be easily installed on the computer housing by attaching the lugs to the respective holes and inserting a rear end of the plug in the corresponding hole.

6 Claims, 7 Drawing Sheets

ASSEMBLING STRUCTURE FOR ELECTRONIC MODULES

BACKGROUND OF THE INVENTION

1. Field of the Invention

The present invention relates to an assembling structure for electronic modules installed in a computer housing or distribution backbone.

2. Description of Related Art

Enterprises and homes now commonly have an LAN incorporated in the premises for their internal communications or connection to the Internet. The LAN generally includes a server and terminals connected to at least one electronic module such as a hub, router etc. Of course, the server computer also can be installed with other electronic modules for voice, data, video, security, automation, or entertainment applications. The electronic module is generally installed in a computer housing of the server or a distribution backbone.

With reference to FIGS. 6 and 7, in a first conventional assembling structure, an electronic module (60) has a plurality of ports (61) and sockets (62) formed thereon. Two lugs (63) are formed at a first side of the electronic module (60), and two sleeves (64) are provided at a second side of the electronic module (60). The lugs (63) and the sleeves (64) are respectively inserted in holes (81) in a computer housing (80). Each sleeve (64) has a plurality of wings (65) formed thereon, and a plurality of slots respectively defined between the wings (65). A button (70) has a large end (71) and a small end (72) inserted in each of the sleeves (64). The wings (65) will extend outwards when the small end (72) of the button (70) is inserted in the sleeve (60) to fasten the sleeve (60), so the electronic module (60) is secured in the computer housing (10).

However, it is very inconvenient to assemble the electronic module (60), and the button (70) often disengages from the sleeve (64), so the electronic module (60) will loosen from the computer housing (10).

With reference to FIGS. 8–9, a second conventional structure is similar to the first conventional structure except that two sleeves (64) and two buttons (70) are provided at the first side of the electronic module (60') to replace the lugs (63) mentioned above.

It is also inconvenient to assemble the electronic module on the computer housing because the sleeves (64) and buttons (70) must be aligned with the holes (81) of the computer housing.

Therefore, the invention provides an assembling structure for electronic modules installed in a computer housing to mitigate or obviate the aforementioned problems.

SUMMARY OF THE INVENTION

The main objective of the present invention is to provide an assembling structure which can facilitate installation of an electronic module in a computer housing.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
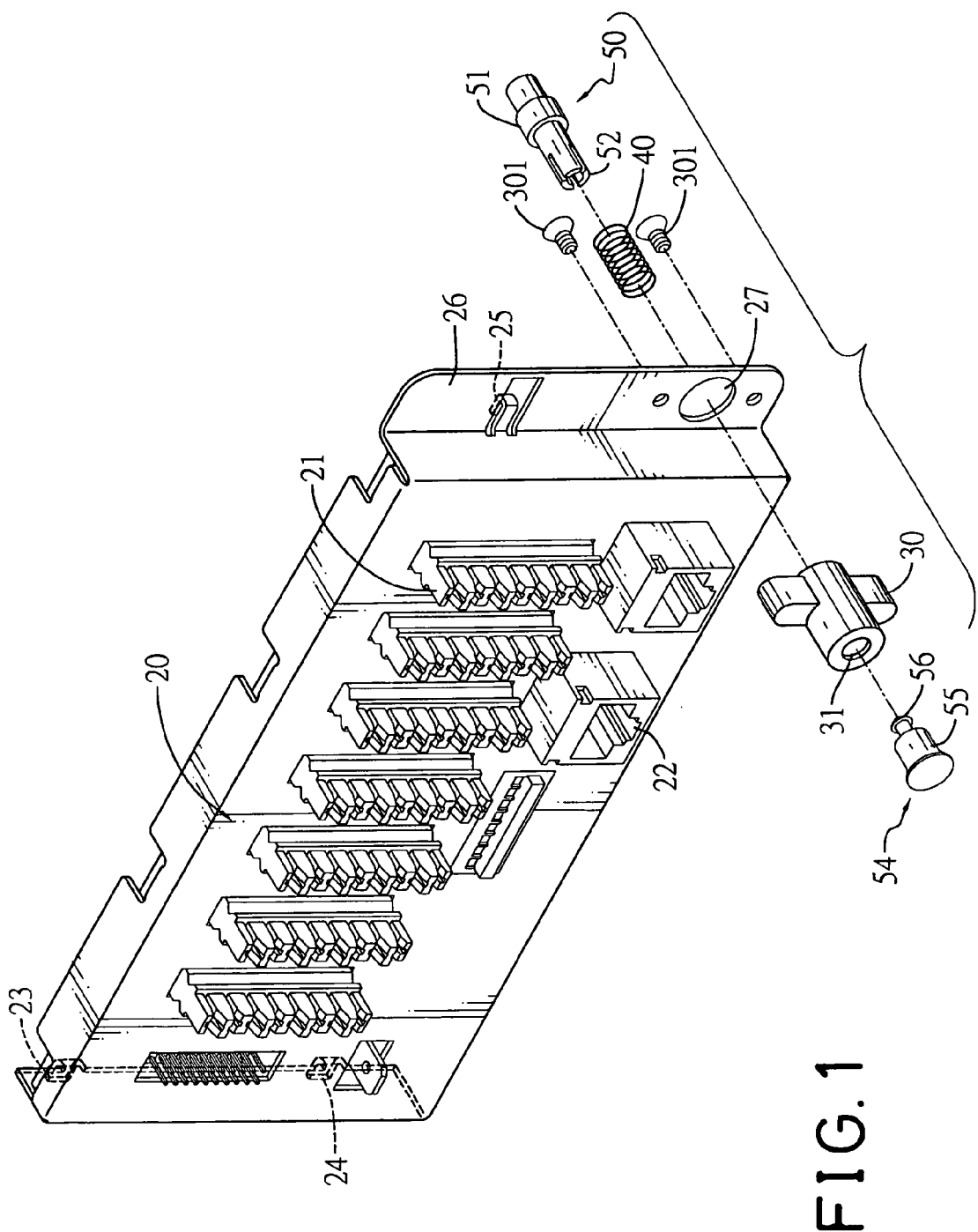
FIG. 1 is an exploded perspective view of an electronic module in accordance with the present invention.
Figure 2:
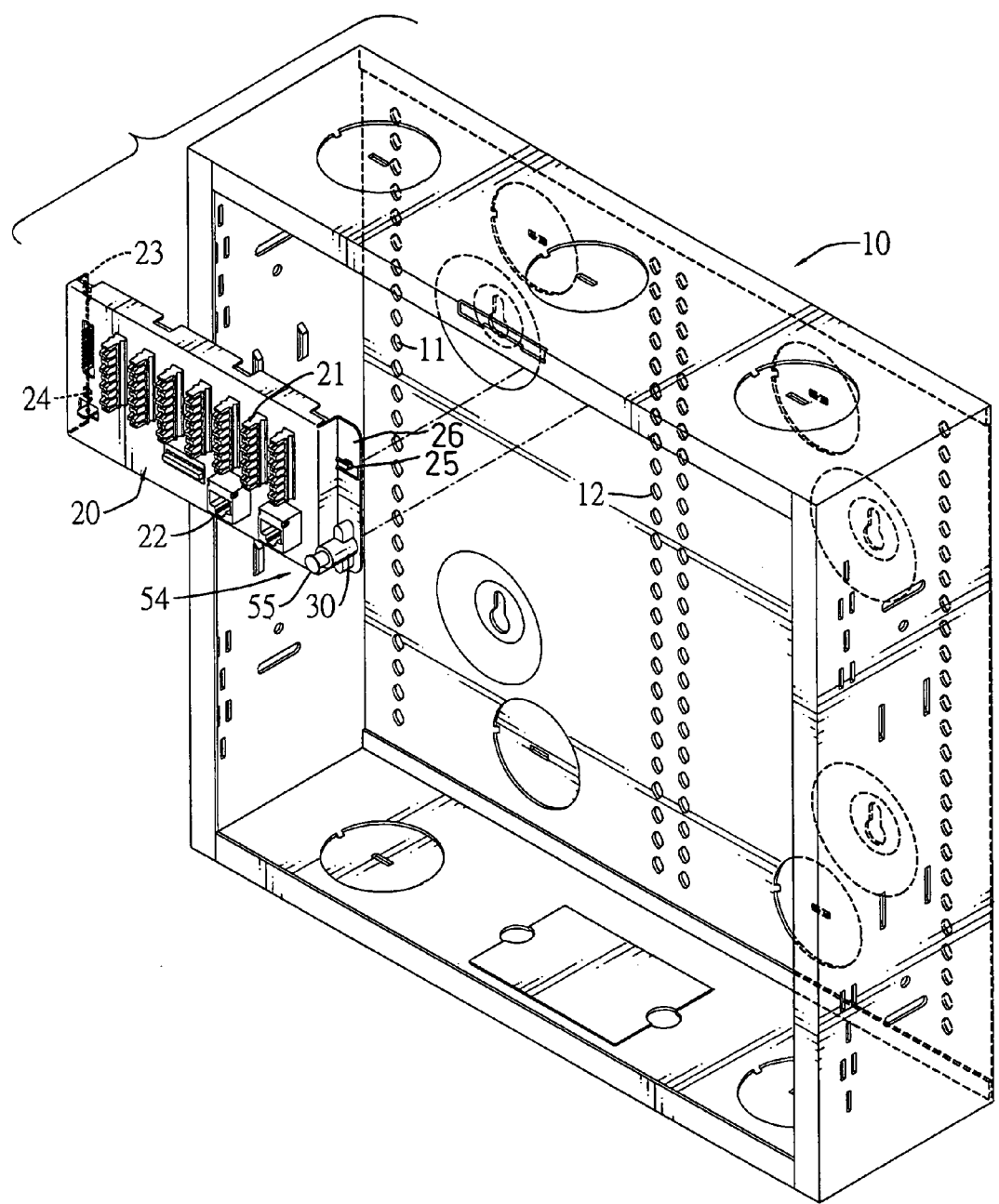
FIG. 2 is an exploded perspective view of the electronic module and a computer housing in accordance with the invention.
Figure 3:
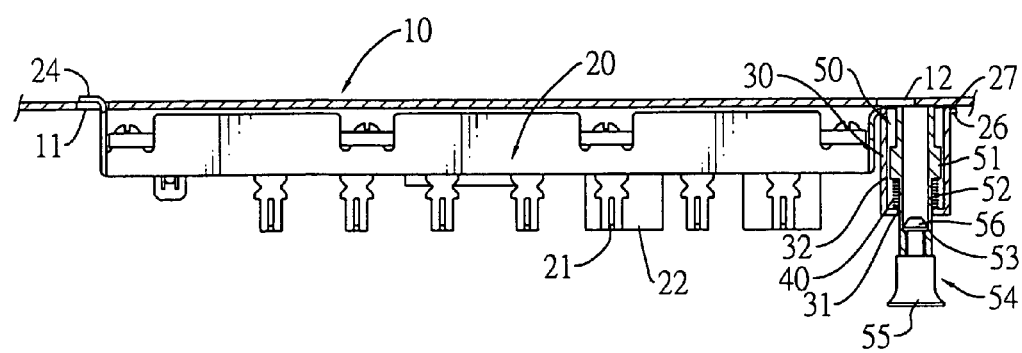
FIG. 3 is a top cross sectional view of the electronic module and the computer housing before being assembled completely.

With reference to FIGS. 1–3, an assembling structure in accordance with the present invention has a computer housing (10), and multiple rows of first holes (11) and second holes (12) each with an oval cross section are defined through the computer housing (10).

An electronic module (20) has multiple ports (21) and sockets (22) formed thereon. The electronic module (20) can be an allotter, an amplifier etc. A first lug. (23) and a second lug (24) are formed at a first side of the electronic module (20) and can be attached to the first holes (11).

A third lug (25) is formed at a second side of the electronic module (20) and can be attached to the second hole (12). A tongue (26) laterally extends from the second side of the electronic module (20), and an aperture (27) is defined through the tongue (26).

A sleeve (30) is secured on the tongue (26) by screws (301) and has a stepped passage (not numbered) aligned with the aperture (27). The stepped passage has a first segment (31) away from the aperture (27) and a second segment (32) near the aperture (27), wherein the first segment (31) has an inner diameter smaller than that of the second segment (32).

A plug (50) has a front end (not numbered), a rear end (not numbered) and a flange (51) between the front end and rear end. The front end is in turn inserted in the aperture (27) and the second segment (32) of the sleeve (30). Multiple claws (52) are formed at the front end of the plug (50), and each have a stop (53) formed therein. The rear end of the plug (50) is inserted in a corresponding second hole (12) of the computer housing (12). A resilient member (40) is provided between the front end of the plug (50) and the second segment (32) of the sleeve (30).

A pin (54) has a head (55) and a foot (56) with a smaller outer diameter than that of the head (55). The foot (56) is inserted in the first segment of the sleeve (30) and the plug (50) and held by the stops (53) to fasten the plug (50) in the sleeve (30).

With reference to FIGS. 2–3, the electronic module (20) is installed in the computer housing (10). In assembly of the structure, the first and second lugs (23, 24) are attached in two corresponding first holes (11), and the third lug (25) is attached in a corresponding second hole (12).

Figure 4:
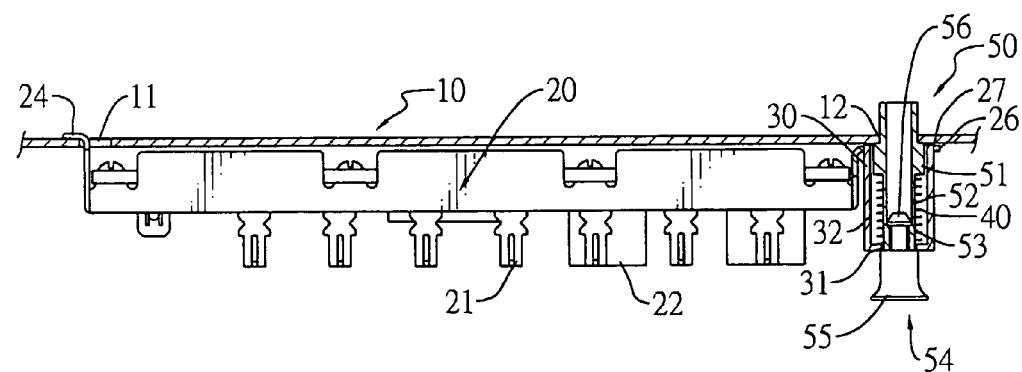
FIG. 4 is a top cross sectional view of the electronic module and the computer housing being assembled completely.

The aperture (27) is aligned with another second hole (12), and the sleeve (30) is mounted on the tongue (26). The front end of the plug (50) is inserted in the aperture (27) and sleeve (30), and the resilient member (40) is provided between the front end of the plug (50) and the sleeve (30). The foot (56) is inserted in the first segment (31) of the sleeve (30) and positioned by the stops (53), as shown in FIG. 4. Thus, the plug (50) is fastened by the pin (54) in the sleeve (30). Under the force of the resilient member (40), the rear end of the plug (50) is positioned in the corresponding second hole (12). Therefore, the electronic module (20) is assembled in the computer housing (10).

For disassembling the electronic module (20), a user can hold the head (55) of the pin (54) to pull the plug (51) towards the sleeve (30). When the rear end of the plug (51) is disengaged from the second hole (12), the electronic module (20) can be moved laterally to remove the lugs (23, 24, 25) respectively from the first and second holes (11, 12). Thus, the electronic module (20) is detached from the computer housing (10).

The present invention makes it is very easy and convenient for the user to assemble and disassemble the electronic module (20) by using only one hand. Moreover, the electronic module (20) can be securely fastened on the computer housing, and will not become loose.

Figure 5:
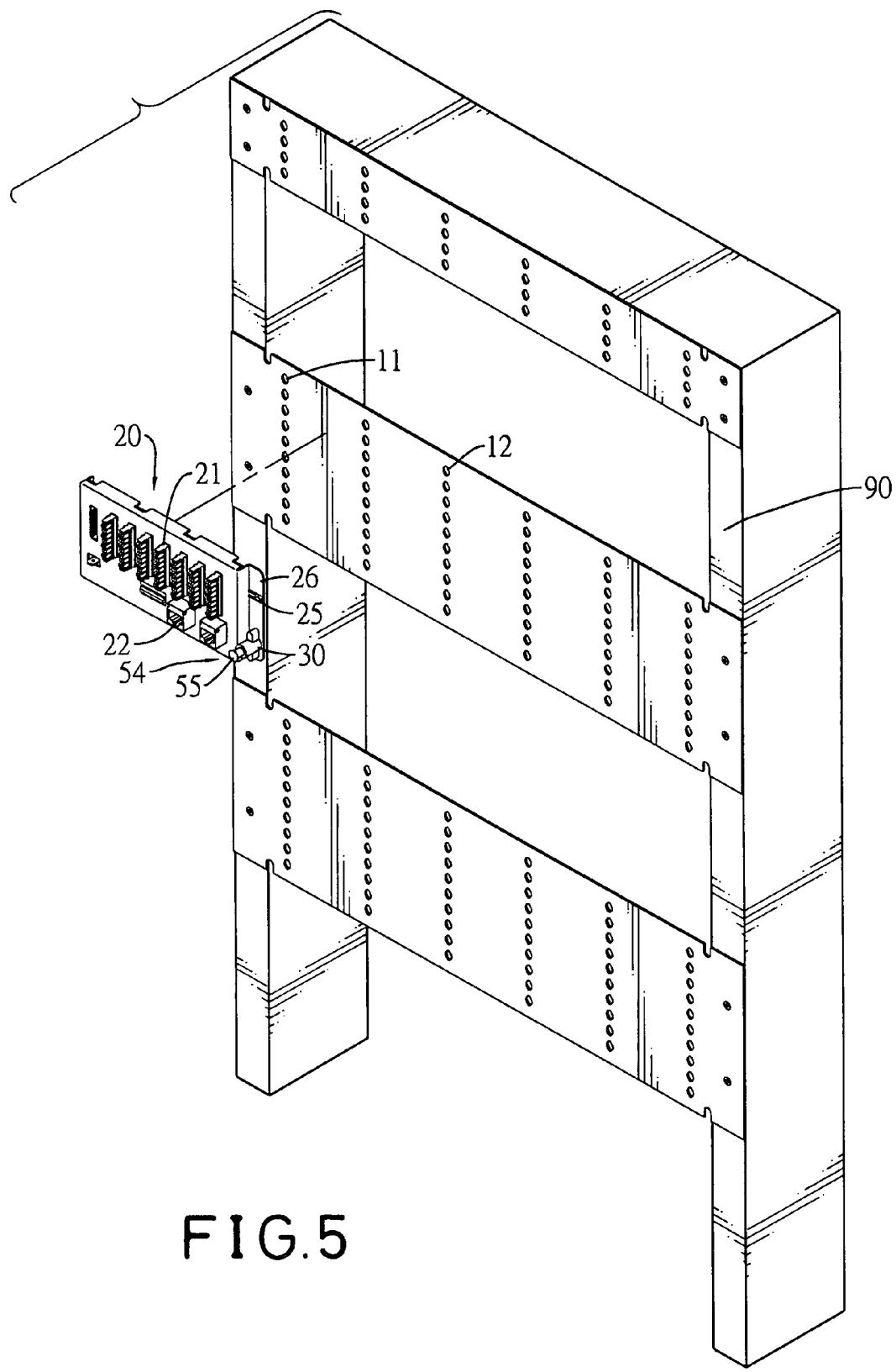
FIG. 5 is an exploded perspective view of a second embodiment in accordance with the present invention.
Figure 6:
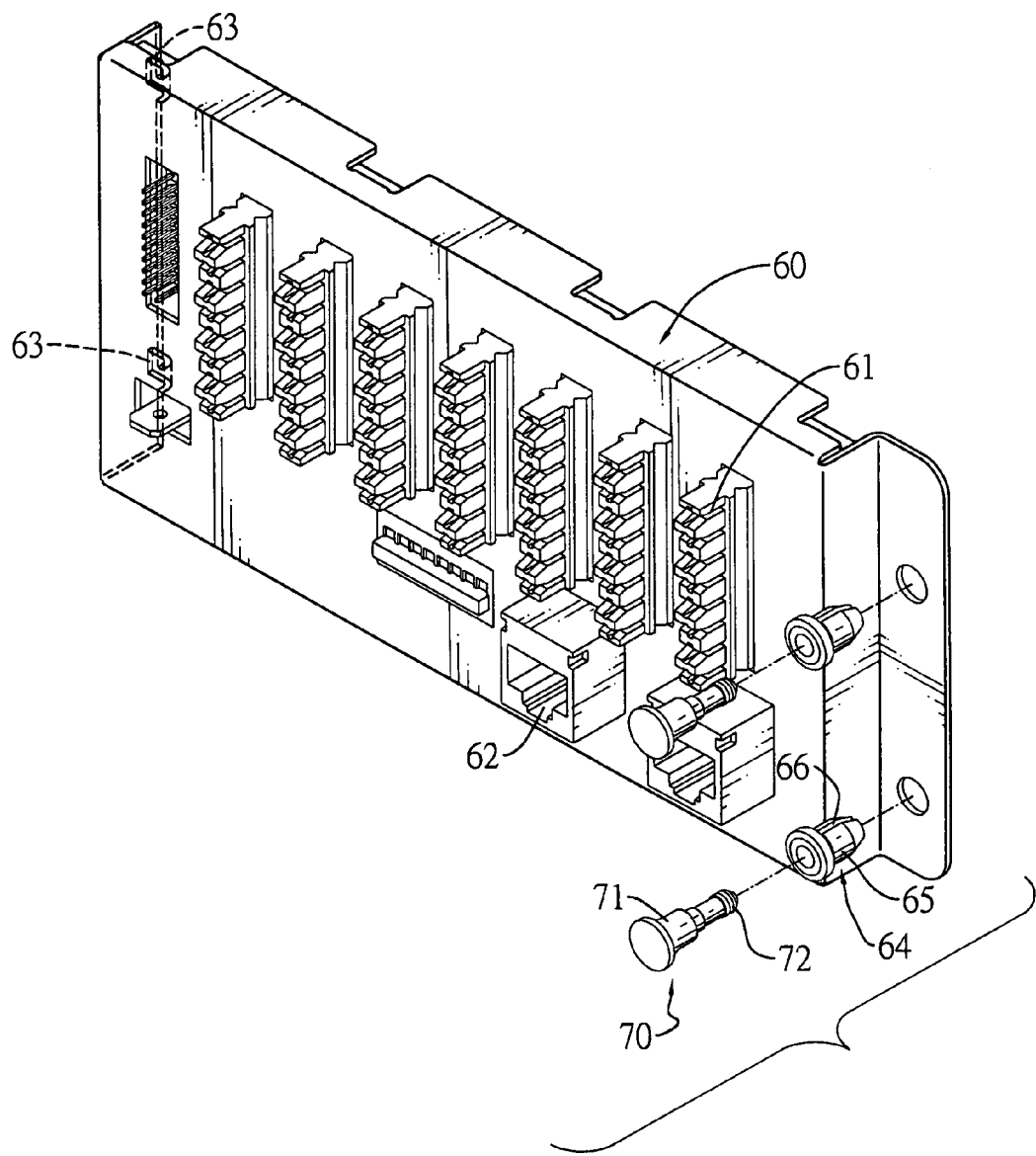
FIG. 6 is an exploded perspective view of a first conventional electronic module.
Figure 7:
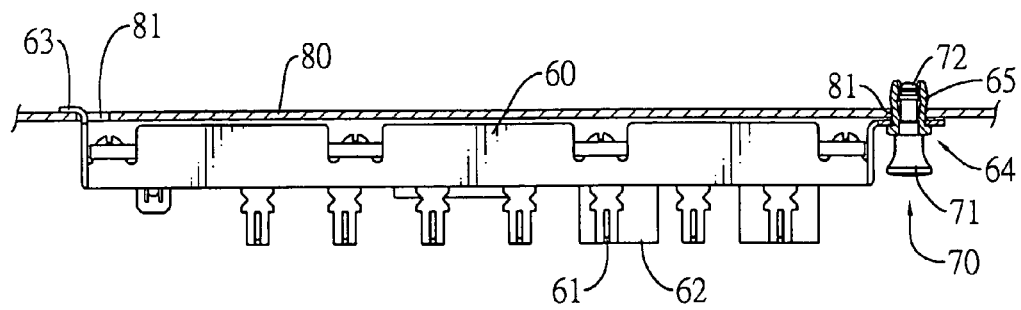
FIG. 7 is a top cross sectional view of the first conventional electronic module being assembled on a computer housing.
Figure 9:
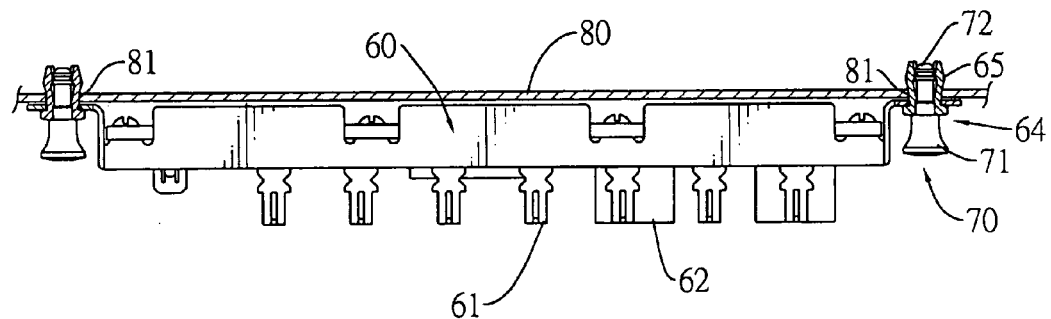
FIG. 9 is a top cross sectional view of the second conventional electronic module being assembled on a computer housing.
Figure 8:
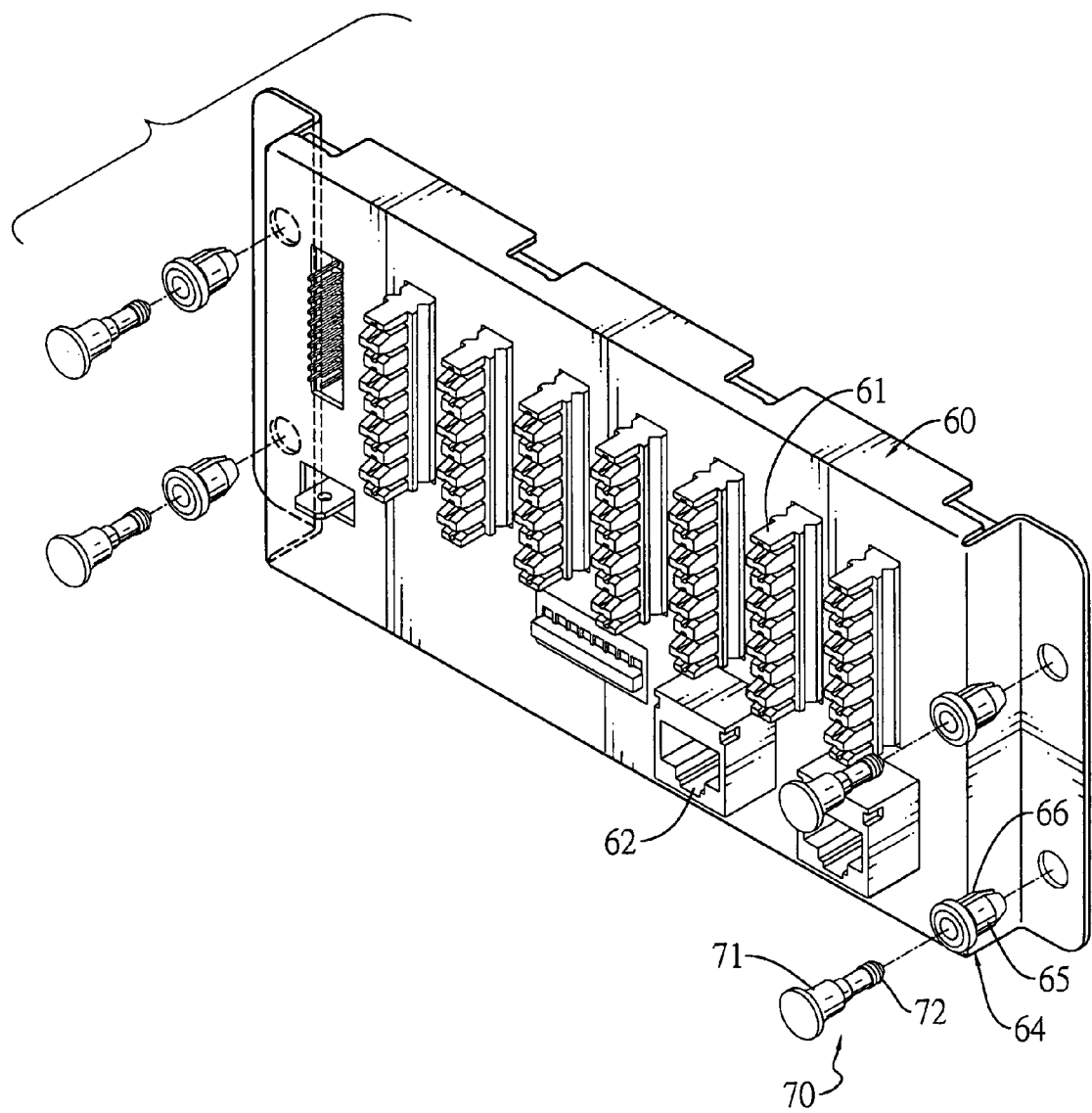
FIG. 8 is an exploded perspective view of a second conventional electronic module.

With reference to FIG. 5, in a second embodiment, the electronic module (20) can be installed on a distribution backbone (90). The distribution backbone (90) has multiple rows of first holes (11) and second holes (12) the same as those mentioned above. Thus, the electronic module (20) is assembled on the distribution backbone (90) in a similar manner.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An assembling structure for an electronic module on a computer housing, the assembling structure comprising:
   a computer housing (10) having multiple rows of holes;
   an electronic module (20) having a first lug (23) and a second lug (24) formed at a first side of the electronic module (20), a third lug (25) formed at a second side of the electronic module (20), a tongue (26) laterally extending from the second side, and an aperture (27) defined through the tongue (26), wherein the lugs (23, 24, 25) are attached to the corresponding holes of the computer housing, and the aperture (27) is aligned with the corresponding hole of the computer housing (10);
   a sleeve (30) mounted on a surface of the tongue (26) away from the computer housing (10), the sleeve (30) having a stepped passage aligned with the aperture (27), wherein a first segment (31) of the stepped passage away from the aperture (27) has an inner diameter smaller than an inner diameter of a second segment (32) adjacent the aperture (27);
   a plug (50) received in the sleeve (30) and having a front end extending in the first segment (31) through the second segment (32), a rear end extending through the aperture (27) and the hole of the computer housing, a flange (51) formed between the front and rear end and received in the first segment (31);
   a resilient member (40) provided between the front end of the plug (50) and the sleeve (30) and abutting the flange (51); and
   a pin (54) having a head (55) and a foot (56) with an outer diameter smaller than an outer diameter of the head (55), the foot (56) extending in the first segment (31) of the sleeve (30) and positioned in the front end of the plug (50).

2. The assembling structure for an electronic module on a computer housing as claimed in claim 1, wherein the front end of the plug (50) has multiple claws (52), and multiple stops (53) respectively formed inside the claws (52); and the foot (56) of the pin (54) is inserted in the claws (52) and fastened by the stops (53).

3. The assembling structure for an electronic module on a computer housing as claimed in claim 1, wherein the holes each have an oval cross section.

4. An assembling structure for an electronic module on a distribution backbone, the assembling structure comprising:
   a distribution backbone (90) having multiple rows of holes;
   an electronic module (20) having a first lug (23) and a second lug (24) formed at a first side of the electronic module (20), a third lug (25) formed at a second side of the electronic module (20), a tongue (26) laterally extending from the second side, and an aperture (27) defined through the tongue (26), wherein the lugs (23, 24, 25) are attached to the corresponding holes of the distribution backbone (90), and the aperture (27) is aligned with the corresponding hole of the distribution backbone (90);
   a sleeve (30) mounted on a surface of the tongue (26) away from the distribution backbone (10), the sleeve (30) having a stepped passage aligned with the aperture (27), wherein a first segment (31) of the stepped passage away from the aperture (27) has an inner diameter smaller than an inner diameter of a second segment (32) adjacent the aperture (27);
   a plug (50) received in the sleeve (30) and having a front end extending in the first segment (31) through the second segment (32), a rear end extending through the aperture (27) and the hole of the distribution backbone, a flange (51) formed between the front and rear end and received in the first segment (31);
   a resilient member (40) provided between the front end of the plug (50) and the sleeve (30) and abutting the flange (51); and
   a pin (54) having a head (55) and a foot (56) with an outer diameter smaller than an outer diameter of the head (55), the foot (56) extending in the first segment (31) of the sleeve (30) and positioned in the front end of the plug (50).

5. The assembling structure for an electronic module on a distribution backbone as claimed in claim 4, wherein the front end of the plug (50) has multiple claws (52), and multiple stops (53) respectively formed inside the claws (52); and the foot (56) of the pin (54) is inserted in the claws (52) and fastened by the stops (53).

6. The assembling structure for an electronic module on a distribution backbone as claimed in claim 4, wherein the holes each have an oval cross section.

* * * * *